United States Patent [19]

Shubert

[11] E Re. 30,360

[45] Reissued Aug. 5, 1980

[54] MAGNETIC SEPARATION OF PARTICULATE MIXTURES

[75] Inventor: Roland H. Shubert, Reston, Va.

[73] Assignee: Maryland Patent Development Co., Inc., Reston, Va.

[21] Appl. No.: 860,567

[22] Filed: Dec. 14, 1977

Related U.S. Patent Documents

Reissue of:

[64] Patent No.: 3,926,789
Issued: Dec. 16, 1975
Appl. No.: 376,335
Filed: Jul. 5, 1973

[51] Int. Cl.[2] ..... B03O 1/00

[52] U.S. Cl. ..... 209/8; 209/214; 209/39

[58] Field of Search ..... 209/8, 39, 40, 2, 4, 209/1, 3, 49, 214, 215; 423/53, 113, 156, 39, 40; 210/42; 252/62.25

[56] References Cited

U.S. PATENT DOCUMENTS

| | | | |
|---|---|---|---|
| 933,717 | 9/1909 | Lockwood | 209/8 |
| 959,239 | 5/1910 | Lockwood | 209/8 |
| 996,491 | 6/1911 | Lockwood | 209/8 |
| 1,043,850 | 11/1912 | Lockwood | 209/8 X |
| 1,043,851 | 11/1912 | Lockwood | 209/8 |
| 1,823,852 | 9/1931 | Brandus | 209/9 X |
| 2,352,324 | 6/1944 | Mibler | 209/2 |
| 2,642,514 | 6/1953 | Merkenhoff | 210/24 |
| 3,214,378 | 10/1965 | Mannemon | 252/62.52 |
| 3,272,758 | 9/1966 | De Lew | 210/42 X |
| 3,480,555 | 11/1969 | Jackson | 252/62.56 |
| 3,635,819 | 1/1972 | Kaiser | 210/40 |

FOREIGN PATENT DOCUMENTS

| | | | |
|---|---|---|---|
| 1336908 | 11/1973 | United Kingdom . | |
| 116147 | 11/1958 | U.S.S.R. . | |
| 235591 | 6/1969 | U.S.S.R. | 209/5 |
| 452500 | 4/1975 | U.S.S.R. | 209/214 |

OTHER PUBLICATIONS

U.S. Bureau of Mines Ri 6081, Wasson et al. 2/1962.

*Primary Examiner*—Robert Halper

[57] ABSTRACT

Particulate mixtures of non-magnetic or paramagnetic materials are separated by selectively coating the surfaces of a component or components of the mixture with a magnetic fluid. Thereafter, the particulate mixture is subjected to a magnetic separation yielding a magnetic fluid-coated fraction and a non-magnetic fraction. The process is especially useful in mineral beneficiation wherein a mineral concentrate is recovered from its ore.

29 Claims, 2 Drawing Figures

MAGNETIC SEPARATION OF PARTICULATE MIXTURES

Matter enclosed in heavy brackets [ ] appears in the original patent but forms no part of this reissue specification; matter printed in italics indicates the additions made by reissue.

BACKGROUND OF THE INVENTION

Magnetic separation of particulate mixtures is highly developed and long-practiced. The technique may be practiced as a wet process, such as in a water slurry, or may be used to separate a dry particulate mixture. Magnetic separation is cheap, highly selective, efficient and lends itself to both small scale and large volume uses. It is fundamental, of course, that a practical magnetic separation process requires either the desired or the reject fraction of the mixture treated be magnetic. Since the vast majority of particulate mixture separated on an industrial scale comprise materials which are diamagnetic, or at best paramagnetic, magnetic separation has remained a special purpose type of process suited only to a relatively few uses.

Efforts have been made in the past to alter the properties of materials, especially minerals, to render them magnetic. It is known, for example that the magnetic properties of many minerals can be altered by subjecting them to a heat treatment. This is the simplest and at this time probably the only practical method for altering magnetic properties of most materials. The process may be accomplished by a simple heating as in the case of pyrite which loses sulfur and is converted to pyrrhotite at temperatures on the order of 600° C.: an oxidizing roast as for many sulfides: a reducing roast as for hematite and other iron oxides or may be a combination of these and similar treatment steps. Examples of minerals which are known to display increased magnetic activity after heat treatment include pyrite, hematite, marcasite, siderite, chalcopyrite, arsenopyrite, bornite and pyrolusite. Temperatures required in the heat treatment step generally range from about 300° to 1000° C. While heat treatment to enhance the magnetic properties of such minerals is technically feasible, it is seldom economically practical. Copper sulfide ores, such as bornite and chalcopyrite for example, seldom exceed a few percent copper concentration. A heat treatment of such an ore to render the copper sulfide magnetic preparatory to a magnetic separation would require the heating of vast qualities of gangue which makes the technique economically prohibitive. Attempts have also been made to cause a magnetic particle to attach to a non-magnetic particle and thus allow a magnetic separation to be performed with recovery of the non-magnetic particle. A description of some such attempts and a discussion of their relative successes and limitations are set out in the Herkenhoff patent, U.S. Pat. No. 2,423,314 and in the Gompper patent, U.S. Pat. No. 2,828,010.

SUMMARY OF THE INVENTION

I have found that particulate mixtures of non-magnetic or paramagnetic materials may be separated by selectively rendering magnetic the surfaces of one or more components contained in the mixture and thereafter subjecting the mixture to a magnetic separation. Surfaces of selected components contained in the mixture are magnetized by selectively coating these components with a magnetic fluid.

The selective coating step is preferably accomplished with the particulate mixture in liquid suspension. Thereafter, the magnetic separation may be accomplished either directly from the liquid suspension or the particulate mixture may be separated from liquid suspension dried and subjected to a dry magnetic separation. My process is particularly applicable to the beneficiation of minerals; especially to the separation, concentration and recovery of metal values from their naturally occuring ores.

Hence, it is an object of my invention to selectively magnetize at least one component of a particulate mixture.

It is another object of my invention to separate particulate mixtures of non-magnetic and paramagnetic materials by magnetic means.

Another object is to separate minerals from their associated gangue.

One specific object of my invention is to separate and recover metal values from their naturally occuring ores.

Yet another specific object of my invention is to recover coal from coal wastes.

DETAILED DESCRIPTION OF THE INVENTION

Figure 1:
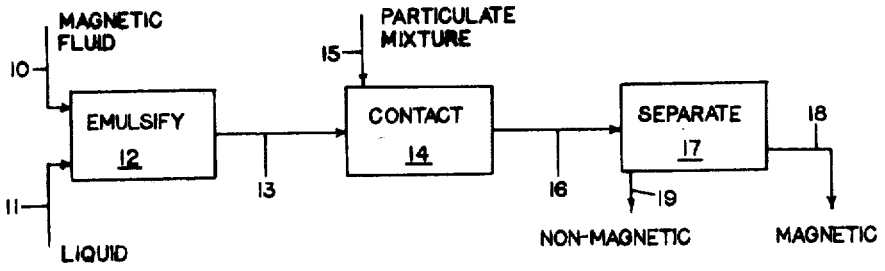
FIG. 1 is a diagrammatic flow sheet depicting a general embodiment of my process.

I have found that a film of magnetic fluid may be selectively applied to one or more components of a particulate mixture and that the applied magnetic film renders those components sufficiently magnetic as to allow a simple magnetic separation to be performed upon the mixture. My process is especially applicable to relatively finely divided particulate mixtures such as those normally encountered in the benefication of ores.

Magnetic fluids useful in my process include those fluids which have become known in the art as "ferrofluids". Magnetic fluids, or ferrofluids, are ultra-stable colloidal suspensions of magnetic particles in a liquid carrier. These fluids behave as homogenious Newtonian liquids and can react with an external magnetic field. The liquid carrier or base may be a hydrocarbon, fluorocarbon, silicone oil, water, ester or similar liquid. Magnetic fluids are commercially available in a range of liquid carriers and display a saturation magnetization as high as about 1000 gauss. Such fluids may be produced by several different methods. Magnetic fluids were first produced by the long term grinding of magnetite in a hydrocarbon such as kerosene containing an appropriate dispersing agent such as oleic acid. This technique is set out in the Papell patent, U.S. Pat. No. 3,215,572. Magnetic fluids may also be produced by the method of Reimers and Khalafalla which is described in U.S. patent application Ser. No. 275,382; now U.S. Pat. No. 3,843,540. An excellent review of the properties and behavior of magnetic fluids may be found in an article by R. E. Rosenweig entitled "Magnetic Fluids" and appearing in International Science & Technology, July, 1966, pp. 48–56.

My invention resides in the discovery that magnetic fluids can be caused to selectively wet and coat particles of one composition in admixture with particles of differing composition. The coating so formed is adherent and of sufficient magnetic strength as to render the coated particle responsive to a magnetic field. Hence the coated particles may thereafter be separated from non-coated particles by conventional magnetic separation techniques.

In principle, the reason that magnetic fluids can be caused to selectively coat particles of one composition while leaving other admixed particles unaffected depends upon the relative wettability of the particle surfaces. Desired selectivity may be influenced in a number of different ways. One method for achieving selectivity is by choice of the liquid carrier making up the magnetic fluid. For example, most minerals exhibit a strongly polar surface and thus are wetted by water but not by hydrocarbon. Hence, a hydrocarbon base magnetic fluid will not wet such minerals. However, some minerals tend to exhibit hydrophobic surfaces and a hydrocarbon base magnetic fluid will readily wet those while leaving particles having a polar surface unaffected. Examples of such minerals include a variety of carbonaceous metal ores, anthracite and other coals and some metal sulfides such as molybdenite. Thus, a mixture containing particles displaying both hydrophobic and hydrophilic surface properties may be directly treated with a hydrocarbon base magnetic fluid resulting in the selective coating of the hydrophobic particle surfaces with the magnetic fluid. A magnetic separation may then be performed to recover two fractions; one fraction being magnetic and comprising those minerals having hydrophobic surface properties and the other fraction being non-magnetic and comprising those minerals having hydrophilic or polar surface properties.

Proper choice of the magnetic fluid liquid carrier allows the separation of a variety of particulate mixtures. But greatly enhanced selectivity and variety of particulate mixtures amenable to separation by my process can be achieved by modifying the surface properties of one or more of the components contained in the particulate mixture. Modification of particle surface properties may be accomplished in a fashion similar to that used in conventional flotation processes. Flotation is a method of materials separation which is based on the affinity of properly prepared mineral surfaces for air bubbles. In froth flotation, the most common form, a froth is formed by introducing air into a suspension or pulp of finely divided particles in water containing a frothing agent. Those particles having an affinity for air bubbles rise to the surface of the froth while particles completely wetted by water remain in suspension.

Selectivity of conventional flotation processes is achieved principally by imparting an aerophilic, or air-avid, coating on certin classes of mineral particles by reacting the mineral surfaces with xanthrates, aliphatic acids, amines and a variety of other chemicals to give in effect a hydrophobic but aerophilic surface. In nearly all cases such an aerophilic surface is also organophilic and so will be readily wet by a hydrocarbon. This fortunate circumstance allows me to take advantage of the developed methods of surface treating mineral particles and extends the usefulness of my process to substantially all of the separations now accomplished by flotation. In addition, such surface treating techniques allows the use of hydrocarbon base magnetic fluid for most separations. This is advantageous in that hydrocarbon base magnetic fluids are presently the cheapest and most readily available type.

In its broadest form my invention comprises contacting a particulate mixture of solid materials with a magnetic fluid. To attain a selective coating of magnetic fluid on one or more components of the mixture while leaving other components substantially unaffected, it is necessary that the surfaces of those components to be coated be readily wettable by the magnetic fluid while the surfaces of other components must either be difficulty wettable or non-wettable by the fluid. Coated particles are then separated from non-coated particles by magnetic means.

Contacting the particulate mixture with a magnetic fluid may be accomplished by tumbling or otherwise mixing or agitating the particles with a relatively small quantity of magnetic fluid. Only enough magnetic fluid need be used to form a relatively thin film upon the surfaces of those particles which are wet by the fluid. An excess of magnetic fluid in some cases can lead to a lessened selectivity.

In most instances, however, it is advantageous and preferred to contact a liquid suspension or pulp of the particulate mixture with magnetic fluid rather than performing the contacting step in the dry state. This is especially true of most mineral beneficiation processes wherein it is desired to obtain a mineral concentrate from its ore. It is conventional practice in most ore beneficiation processes to grind the crude ore with water in rod or ball mills to a size range whereat there is obtained substantially complete liberation of the desired mineral particles from the associated gangue. The slurry or pulp of ground ore is then conditioned, usually by chemical treatment, to modify the surface properties of one or more components or classes of components contained in the ore. After conditioning, the slurry or pulp is conventionally treated by froth flotation to recover a mineral concentrate.

My process can conveniently encompass the grinding and conditioning steps of a typical flotation process. After conditioning, if that step is necessary or appropriate, I contact the slurry or pulp with a magnetic fluid. Contacting is best accomplished under conditions of thorough agitation so as to uniformly disperse and coat the wettable particles with magnetic fluid. It is advantageous, especially when using a hydrocarbon base magnetic fluid, to first emulsify the magnetic fluid in a relatively small volume of water and add the emulsion to the pulp or slurry. Such an emulsifying step tends to reduce the amount of magnetic fluid needed and tends to give a more uniform coating on wettable particles than does adding the fluid directly to the aqueous pulp. Emulsification is easily accomplished by intense agitation of water and the magnetic fluid to form an emulsion with water as the continuous phase.

The minimum amount of magnetic fluid required is that sufficient to form a thin coating on the surfaces of those particles wettable by the fluid. When using my process in ore benefication, it is usually desirable to select a fluid and appropriately condition the ore so that the mineral rather than the gangue is wet by the magnetic fluid since gangue usually makes up the bulk of an ore. Since particle surfaces are coated and surface area is a function of particle size, generally the finer the particle size the more magnetic fluid is required. Thickness of the magnetic film, and hence intensity of magnetic response, can be controlled to some degree by the amount of magnetic fluid used. However, use of excessive amounts of magnetic fluid results in at least a portion of the excess remaining in emulsified form in the water. Further, the intensity of magnetic response of a coated particle can better be controlled by proper choice of the saturation magnetization of the magnetic fluid used. It is also apparent that the amount of magnetic fluid required is dependent upon the concentration of the magnetic fluid-wettable particles in the mixture. In more specific terms, amount of magnetic fluid required to treat a particular ore appears to be comparable to the amount of flotation/reagent required for that same ore. For most ores, this will usually be in the range of about 0.01 to 10 pounds of magnetic fluid per ton of ore.

After selectively coating one component, or class of components, in the ore I subject the treated material to a magnetic separation. This may be either a wet magnetic separation in which a magnetic fraction is recovered directly from the slurry or pulp or a dry magnetic separation may be performed after de-watering and drying. Both techniques are well known and highly developed. A variety of both wet and dry magnetic separators appropriate for use in my process are commercially available.

Size range of particulate mixtures amenable to treatment by my process encompasses that range normally treated by flotation techniques. Generally the maximum diameter of mineral particles recoverable by froth flotation is on the order of 300 microns or about 50 mesh. My process is not so limited and can be successfully used to separate particulate mixtures of much larger particle size especially if a dry magnetic separation is performed. Presence of very fine colloidal particles or slimes is undesirable in my process as it is in flotation. But my process appears to be less hindered by very fine particles than is flotation because the small, magnetic fluid-coated particles tend to agglomerate in the form of chains and rings.

Referring now to the drawings, FIG. 1 is a diagrammatic representation of my process applicable to particulate mixtures generally. A magnetic fluid 10 and a second liquid 11 are emulsified in means 12 and the emulsion 13 is passed to contacting means 14 into which a particulate mixture 15 is introduced. Intimate mixing of the mixture 15 and emulsion 13 results in the selective coating of a component or class of components of mixture 15. The treated mixture, now having selected particles carrying a thin coating of magnetic fluid, is passed via transport means 16 to magnetic separator 17 which separates the particulates into a magnetic fraction 18 and a non-magnetic fraction 19.

It is necessary that magnetic fluid 10 and liquid 11 be immiscible one in the other. Perhaps the most common example of such a system is a hydrocarbon base magnetic fluid and water. In addition, it is necessary that the magnetic fluid selectively wet particular components of mixture 15 and it is much preferred that liquid 11 selectively wet other components of the particulate mixture. Particulate mixture 15 may be introduced into contacting means 14 in a dry or semi-dry state or may be introduced as a suspension or pulp in a liquid. If mixture 15 is introduced as a liquid suspension, it is much preferred that the liquid be the same as liquid 11 or completely miscible with it. As has been set out previously, it is not necessary but is preferred to emulsify magnetic fluid 10 before it is introduced into contacting means 14.

Figure 2:
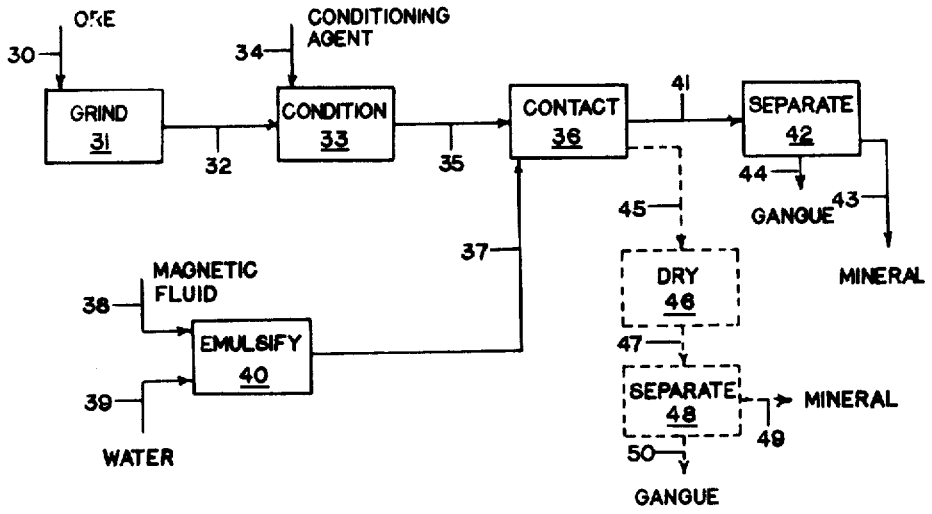
FIG. 2 depicts a specific embodiment of my process directed to the recovery of a mineral concentrate from its ore. Both Figures will be discussed in detail later.

Referring now to FIG. 2, there is shown an embodiment of my process directed to the recovery of a mineral concentrate from its ore. An ore 30 is comminuted in grinding means 31 to a size range whereat the particles of the desired mineral are substantially physically freed from the matrix or gangue. The comminuted ore is sized if necessary and is passed via means 32 to conditioning means 33 wherein the ore is treated with conditioning agent 34 to modify the surface properties of one or more components of the ore. It is to be noted that this conditioning step, though often required and generally desirable, is not necessary with all ores. Grinding and conditioning are usually carried out using water as a carrier liquid. The water suspension of the ore, or pulp, is transported via means 35 to contacting means 36 wherein it is intimately mixed or contacted with an emulsion of magnetic fluid in water introduced via means 37. This emulsion is produced by introducing a magnetic fluid 38, preferably a hydrocarbon base magnetic fluid, and a water stream 39 into emulsifying means 40. As has been noted previously, magnetic fluid 38 may be added directly to contacting means 36 without being emulsified beforehand.

Intimate contacting of ore pulp 35 and magnetic fluid emulsion 37 in means 36 results in the selective coating of magnetic fluid 38 on the surfaces of the mineral particles contained in admixture with gangue particles. The treated pulp is passed from contacting means 36 via conduct means 42 to wet magnetic separator 42 wherein the pulp is separated into a magnetic mineral concentrate 43 and a gangue fraction 44. Alternatively, treated pulp from contacting means 36 may be transferred via means 45 to dewatering and drying means 46. After drying to a free-flowing state, the treated ore is then transported via means 47 to dry magnetic separation means 48 from which is recovered a mineral concentrate 49 and a gangue fraction 50.

The process as embodied in FIG. 2 is applicable to a wide range of ores. Copper sulfide ores such as chalcocite, bornite and the like are often found in a calcareous or siliceous matrix and typically have a copper content on the order of 1%. When treating an ore of this type by the process embodied in FIG. 2, conditioning agent 34 may be ferric chloride and magnetic fluid 38 is preferably of hydrocarbon base. When the ore is zinc sulfide (sphalerite) then conditioning agent 34 may comprise sulfurous acid and again the preferred magnetic fluid is hydrocarbon base. If the ore is carbonaceous, or is anthracite coal for example, the conditioning step 33 may be dispensed with entirely.

Another ore amenable to treatment by the process depicted by FIG. 2 is non-magnetic taconite. Taconite is an iron ore comprising various oxides of iron in a siliceous matrix. Magnetic taconites, comprising mainly magnetite, are readily concentrated by magnetic means. Non-magnetic taconites comprise various non-magnetic iron oxides including hematite and present a much more formidable beneficiation problem. When treating such an ore by my process, conditioning agent 34 may comprise for example a fatty acid or sulfonic acid and, after contacting the conditioned ore with a magnetic fluid in means 36, the non-magnetic taconite may be treated in the same fashion now used to concentrate magnetic taconite.

The following specific examples will serve to further illustrate specific embodiments of my process.

EXAMPLE 1

A sample of copper ore from Tyrone, New Mexico was ground to a size range finer than about 100 mesh. This ore is representative of that presently being mined at Tyrone and comprises chalcocite in a siliceous matrix. The ground ore was slurried in water and then treated with a dilute solution of ferric chloride for about 30 minutes to activate the surface of the copper sulfide particles. The ferric chloride solution was then decanted off, the ore washed with water, and re-slurred in a second measure of water. A small quantity of kerosene base magnetic fluid was then added with agitation. After about 1 minute of intense agitation, the slurry was transferred to a non-magnetic vessel. Chalcocite particles could be readily removed from the slurry using a small hand magnet. A portion of the treated ore was then de-watered and dried. Chalcocite particles in the dried ore responded to a magnet. Gangue particles did not.

EXAMPLE 2

A sample of sphalerite (zinc sulfide) ore was ground to a size range finer than about 100 mesh. The ground ore was wet with water and treated with dilute (7%) sulfurous acid for about 15 minutes to activate and condition the surface of the sphalerite particles. After decanting the acid from the ore, it was washed in water, re-slurred in a second measure of water, and treated with a small quantity of hydrocarbon base magnetic fluid with intense agitation. After agitation, sphalerite particles were magnetically responsive both in the slurry and after drying. Gangue particles were not.

EXAMPLE 3

The sphalerite ore of Example 2 was ground to a nominal size range of about −60 mesh. It was conditioned with sulfurous acid in a manner similar to that of Example 2. A quantity of kerosene base magnetic fluid was added to water and subjected to intense agitation to form a semi-stable emulsion. The conditioned sphalerite ore was then added to the magnetic fluid emulsion and agitated for about 2 minutes and then transferred to a non-magnetic container. Sphalerite particles could readily be extracted from the slurry using a small hand magnet.

Microscopic examination of the thus-extracted sphalerite particles showed some agglomeration into chain-like structures and ring-like structures. The ring structures were typically made up of a single row of sphalerite particles arranged in a ring configuration having a diameter as large as about 10 average particle diameters. This ore had a calcite matrix or gangue. A few scattered calcite particles were evident mixed with the magnetically recovered sphalerite. These calcite particles were clear and clean showing no signs of magnetic fluid coating and, when physically separated from the sphalerite particles, displayed no magnetic response.

The ore was then separated from the liquid by filtration and was then dried. The liquid filtrate contained a substantial amount of the originally added magnetic fluid still in emulsified form. In this experiment, the amount of magnetic fluid added was about 3% by weight based on the weight of the sphalerite ore. In spite of the fact that a substantial excess of magnetic fluid was used, there was no evidence of magnetic fluid coating or wetting of the calcite gangue particles.

Portions of the dried, magnetic fluid-treated ore were then subjected to a magnetic separation. An essentially complete separation between the gangue and sphalerite was achieved under the influence of a magnetic field of about 1000 gauss.

EXAMPLE 4

A quantity of finely ground bituminous coal was slurried in water. Small quantities of hydrocarbon base magnetic fluid was added directly to the slurry with agitation. Coal particles responded strongly to a magnet. Ash particles did not.

I claim:

1. A method of recovering a mineral from the gangue constituents of its ore which comprises:

comminuting the ore to a size range whereat there is achieved substantial physical liberation of the mineral from the gangue constituents of the ore;

rendering the surfaces of the mineral particles magnetic by selectively wetting the surfaces of said mineral particles with a magnetic fluid, said magnetic fluid comprising an ultra-stable colloidal suspension of magnetic particles in a liquid carrier, said liquid carrier being selected from the group consisting of hydrocarbons, fluorocarbons, silicone oils, water and esters, said magnetic fluid being capable of reacting with an external magnetic field and displaying the behavior of a homogeneous Newtonian liquid, and subjecting the comminuted ore to a magnetic separation whereby a magnetic concentrate comprising magnetic fluid-wetted mineral particles is recovered.

2. The method of claim 1 wherein the surfaces of mineral particles are not readily wet by water and wherein the surfaces of particulate gangue constituents of the ore are readily wet by water.

3. The method of claim 2 wherein the magnetic fluid is immiscible with water and wherein the mineral particles are selectively wetted with said fluid by contacting a water suspension of said comminuted ore with an amount of magnetic fluid sufficient to form a thin film on the surfaces of mineral particles contained in the ore.

4. The method of claim 3 wherein the mineral is selected from the group consisting of metal sulfides, metal oxides and carbonaceous ores and wherein the magnetic fluid is hydrocarbon base.

5. The method of claim 4 wherein the comminuted ore is subjected to a conditioning [steps] *step* comprising a chemical treatment which renders the surfaces of mineral particles hydrophobic and [organophyllic and wherein said magnetic separation is accomplished by subjecting the magnetic fluid-treated ore to the influence of a magnetic field having a field strength in excess of 1000 gauss] *organophilic.*

6. The method of claim 1 wherein the comminuted ore is subjected to a conditioning step to modify the surface properties of at least one constituent of the ore prior to wetting the mineral particles with said magnetic fluid.

7. The method of claim 6 wherein said conditioning step comprises a chemical treatment which renders the surfaces of mineral particles hydrophobic and [organophylic] *organophilic.*

8. The method of claim 7 wherein said conditioning step is carried out in an aqueous medium and wherein said magnetic fluid is immiscible with water.

9. The method of claim 8 wherein the mineral particles are selectively wetted with said magnetic fluid by contacting a water suspension of comminuted and conditioned ore with an amount of magnetic fluid sufficient to form a thin film on the surfaces of mineral particles contained in the ore.

10. The method of claim 9 wherein the magnetic fluid is hydrocarbon base and wherein the magnetic fluid is in the form of a water emulsion when it is brought into contact with the ore.

11. The method of claim 10 wherein the magnetic separation is a wet separation whereby mineral particles wetted with magnetic fluid are recovered from the water suspension.

12. The method of claim 10 wherein the ore suspension is de-watered and dried to a free-flowing state after being contacted with the magnetic fluid and wherein the dried ore is subjected to a magnetic separation to recover a mineral concentrate.

13. The method of claim 10 wherein the ore is a copper ore and wherein said mineral comprises copper sulfide.

14. The method of claim 13 wherein said conditioning step comprises reacting the surfaces of copper sulfide particles with ferric ion.

15. The method of claim 10 wherein the ore is a zinc ore and wherein said mineral comprises zinc sulfide.

16. The method of claim 15 wherein said conditioning step comprises reacting the surfaces of zinc sulfide particles with a dilute acid.

17. The method of claim 10 wherein the ore is taconite and wherein said mineral comprises non-magnetic iron oxides.

18. The method of claim 17 wherein said conditioning step comprises reacting the surfaces of iron oxide particles with a material selected from the group consisting of fatty acids and sulfonic acids.

19. The method of claim 10 wherein said ore is contacted with magnetic fluid in an amount within the range of 0.01 to 10 pounds of magnetic fluid per ton of ore [and wherein said magnetic separation is accomplished by subjecting the magnetic fluid-treated ore to the influence of a magnetic field having a strength in excess of 1000 gauss].

20. A method for separating [mixtures] *a mixture* of particulate materials, *said mixture containing at least one component having particle surfaces readily wettable by a magnetic fluid and at least one other component having particle surfaces difficulty wettable or non-wettable by said fluid* which comprises [rendering the surfaces of at least one component of said mixture magnetic by selectively wetting the surfaces of said component with a magnetic fluid,] *contacting the mixture with an amount of magnetic fluid sufficient to wet the surfaces of said readily wettable particulate component and to form a thin film thereon,* said magnetic fluid comprising an ultra-stable colloidal suspension of magnetic particles in a liquid carrier, said liquid carrier being selected from the group consisting of hydrocarbons, fluorocarbons, silicone oils, water and esters, said magnetic fluid being capable of reacting with an external magnetic field and displaying the behavior of a homogenous Newtonian liquid, and thereafter subjecting the mixture to a magnetic separation whereby said magnetic fluid-wetted component is separated from the remainder of the mixture.

21. The method of claim 20 wherein the mixture of particulate materials is in liquid suspension and wherein a component of the mixture is selectively wetted by contacting the liquid suspension with a magnetic fluid immiscible in said liquid.

22. The method of claim 21 wherein the mixture of particulate materials is subjected to a conditioning step to modify the surface properties of at least one consitutuent of the mixture prior to contacting the liquid suspension with the magnetic fluid.

23. The method of claim 22 wherein the magnetic fluid is emulsified in a portion of said liquid prior to contacting said liquid suspension of particulate materials with said magnetic fluid.

24. The method of claim 23 wherein the liquid is water, wherein the magnetic fluid is hydrocarbon base and wherein the conditioning step comprises reacting the particle surfaces of at least one constituent of the mixture with a substance which renders said surfaces [organophylic] *organophilic.*

25. The method of claim 24 wherein the magnetic separation is performed in the liquid state whereby particles wetted with magnetic fluid are recovered from the water suspension.

26. The method of claim 24 wherein the particulate suspension is de-watered and dried to a free-flowing state after being contacted with the magnetic fluid and wherein the dried particulate mixture is subjected to a magnetic separation to recover a magnetically responsive fraction comprising particles wetted with magnetic fluid.

*27. The method of claim 5 wherein said magnetic separation is accomplished by subjecting the magnetic fluid-treated ore to the influence of a magnetic field having a field strength of about 1000 gauss.*

*28. The method of claim 19 wherein said magnetic separation is accomplished by subjecting the magnetic fluid-treated ore to the influence of a magnetic field having a field strength of about 1000 gauss.*

*29. The method of claim 20 wherein said particulate materials do not respond to a magnetic field.*

* * * * *